United States Patent [19]
Helsmoortel et al.

[11] Patent Number: 5,093,825
[45] Date of Patent: Mar. 3, 1992

[54] MODULARLY STRUCTURED DIGITAL COMMUNICATIONS SYSTEM

[75] Inventors: Luc Helsmoortel, Bredene; Jaak Lagrou, Torhout; Jose Glas, Deinze, all of Belgium

[73] Assignee: Siemens Aktiengesellschaft, Berlin and Munich, Fed. Rep. of Germany

[21] Appl. No.: 364,111

[22] Filed: Jun. 12, 1989

[30] Foreign Application Priority Data

Jun. 13, 1988 [DE] Fed. Rep. of Germany ....... 3820072

[51] Int. Cl.$^5$ ............................................. H04Q 11/04
[52] U.S. Cl. ..................................... 370/58.2; 370/62; 370/110.1
[58] Field of Search ............... 370/85.9, 85.11, 85.1, 370/58.1, 67, 58.2, 58.3, 62, 77, 79, 110.1, 17, 60; 340/825.06, 825.15, 825.22; 379/158, 202

[56] References Cited

U.S. PATENT DOCUMENTS

| | | | |
|---|---|---|---|
| 3,678,206 | 7/1972 | Dupreux | 370/54 |
| 4,054,757 | 10/1977 | LeJay | 370/62 |
| 4,381,561 | 4/1983 | Treiber | 370/24 |
| 4,694,452 | 9/1987 | Beckinger et al. | 370/58.2 |
| 4,748,560 | 5/1988 | Kataoka | 370/85.9 |
| 4,805,169 | 2/1989 | Van Asselt | 370/85.9 |
| 4,903,258 | 2/1990 | Kuhlmann et al. | 370/58.2 |
| 4,933,936 | 6/1990 | Rasmussen et al. | 370/85.9 |
| 4,972,183 | 11/1990 | Kuhlmann et al. | 340/825.22 |

FOREIGN PATENT DOCUMENTS

3141502C2 7/1982 Fed. Rep. of Germany.

OTHER PUBLICATIONS

"ISDN in the Office—HICOM", in Telcom Report & Siemens Magazin Com, by Harald Thomas & Klaus Wehren, pp. 96-106, 1985.

*Primary Examiner*—Douglas W. Olms
*Assistant Examiner*—Alpus H. Hsu
*Attorney, Agent, or Firm*—Hill, Van Santen, Steadman & Simpson

[57] ABSTRACT

A modularly structured digital communication system. The hardware of the communication system is structured in three hierarchic levels. Periphery modules undertake the adaptation to different terminal equipments and lines, whereby connector modules are connected by a module processor control to two PCM lines allocated to a periphery module and to two control information lines respectively. In a pre-processing level, a control information transmission assembly is allocated to each periphery module and respectively two such transmission assemblies have an input/output processor allocated to them. The highest hierarchic level is represented by a central control processor that is connected by a multiplex bus to the input/output processor and to a switching matrix network device.

12 Claims, 3 Drawing Sheets

MODULARLY STRUCTURED DIGITAL COMMUNICATIONS SYSTEM

BACKGROUND OF THE INVENTION

An article titled "ISDN in the Office - HICOM," in a special issue of Telcom Report and Siemens Magazin COM discloses a modularly structured digital communication system that provides a uniform system for the communication of voice, text and data. The modular system structure is defined by independent function regions in the functional organization of the communication system. Internal interfaces are provided between these individual function regions. Critical function regions are a periphery, a switching matrix array and a central control.

In the periphery, connector modules provide for the interface adaptation between the communications system and equipment having a different communication type or a different signaling procedure. ISDN base terminals used for digital terminals wherein the signaling procedure is sequenced according to an ISDN protocol appear, for example, as subscriber-oriented equipment terminals. Further digital subscriber connector modules (SLMB—subscriber line module burst) provide for one-channel connection of digital voice terminals or switching terminals. Corresponding analog subscriber connector modules (SLMA—subscriber line module analog) are also utilized for the connection of analog voice terminal equipment. In a similar manner, line connector modules are also used as connection interface for analog and digital lines having the traffic modes of exchange traffic, tie trunk traffic as well as main system traffic and sub-system traffic. The connector modules each have a defined plurality of connection interface devices having line adapters as well as an assemblies processor control that is allocated to all of the connection interface equipment. One possible embodiment of such an assemblies processor control is disclosed in U.S. Pat. No. 4,694,452. The assemblies processor control distributes the voice signals or data signals from the connection interface equipment onto time channels of a PCM-structured link (highway) or, effects the coupling of the time channels of a second PCM-structured link to the connection interface equipment. In addition an HDLC interface equipment (high level data link control) is provided, signaling information in the HDLC protocol being forwarded via this equipment to a system controller. A microprocessor in the assemblies processor control executes the protocol control or the processor control and adapts the line signals to the interface messages of the system. The required programs are loaded from a background memory of the system into a memory administered by the microprocessor. The protocol according to ISO layers 1 and 2 is executed for digital connections, whereby the BORSCHT functions are realized for analog connections.

In the prior art communications system, a plurality of subscriber connector modules and/or line connector modules are functionally and structurally combined into a periphery module that is an interface module to the digital switching matrix network and to the system controller. The adaptation of the modularly structured communications system to a different plurality of connected terminal equipment or lines occurs by providing a corresponding plurality of subscriber connector modules or line connector modules per periphery module or by providing two or three periphery modules for an increasing plurality of subscriber or links.

SUMMARY OF THE INVENTION

An object of the present invention is to modularly structure a digital communications system of the type initially set forth such that a simple, additive expandability of existing systems or the configuration of systems having a relatively small plurality of subscriber equipment or line connections (up to about 200) is provided for the greatest possible use of standard telecommunications devices such as connector modules, switching matrix network modules and data transmission modules.

In general the present invention is a communication system having subscriber and line connector modules that each have a plurality of connection interface devices and that has a module processor control allocated to these connection interface devices. The module processor control is connected by two PCM-structured connections to a digital switching matrix network device and has a data interface means for a transfer of control information protected block-by-block between the connector modules and a central control processor allocated thereto. The plurality of connector modules is combined to form at least one periphery module such that a maximum of 32 subscriber lines or links are allocated to the respective periphery module. Each periphery module has a control information transmission assembly allocated to it by means of a transmission channel formed of a transmit channel and a receive channel. At least two transmission equipment are connected to a shared input/output processor that serves for the cyclical scanning of the operating statuses of the connection interface devices of the appertaining periphery modules as well as for the transparent and non-transparent data transmission to the transmission equipment. The input/output processor is connected to a multiplex bus that carries address lines, control lines and data lines. A sequence controller of the switching matrix network device is connected to the multiplex bus. The multiplex bus is connected to and administered by the central control processor that controls all switching-oriented procedures and signaling using a system data memory connected to the central control processor.

A further periphery module is connected by two additional PCM-structured connections to the digital switching matrix network device with a central signaling means having transmission and reception means for call progress tones and selection signals. At least the transmission and reception means for selection signals have a data interface for the block-by-block, protected transfer of binarily coded numbers to be converted into selection signals or derived from the selection signals between the further periphery module and a further transmission assembly allocated thereto. The further periphery module has additional subscriber connector modules and/or line connector modules whose plurality is dimensioned such that a maximum of 32 time channels of the PCM-structured connections can be simultaneously occupied. A conference module that evaluates voice signals of conference calls is connected to the digital switching matrix network device by two further PCM-structured connections and a sequence control of the conference module.

The structure features critical for achieving the additive modularity are the formation of periphery modules that are allocated to a maximum of 32 subscriber lines or links, the provision of a respective (control information) transmission device for every periphery module and the allocation of at least two, preferably at the same time, transmission equipment to an input/output processor.

An advantageous improvement of the present invention serves the purpose of supplying the communications system with call progress tones, for example ringing tones and busy signals or announcements or music in a hold condition of a connection. This development of the present invention simultaneously provides for relieving the connector modules of generating or processing specific selection signals such as, for example, characters in the multi-frequency code. An improvement of the present invention is that a further or additional periphery module is connected to the digital switching matrix network device with two PCM-structured connections and has a central signaling equipment with transmission and reception devices for call progress tones and selection signals. Also provided is that at least the transmission and reception devices for selection signals have a data interface for block-by-block, protected transfer of binarily coded numerals to be converted into selection signals or to be derived from the selection signals between a further periphery module and a further transmission assembly allocated thereto. The transmission of such selection signals similarly occurs in a transmission assembly but on different overall paths than in the case of the selection information that are transmitted directly from one of the periphery modules to the associated transmission assembly. For example, received frequency mixes that are transmitted in the multi-frequency code selection procedure are transmitted via the digital switching matrix network device to the further periphery module equipped with corresponding reception devices. They are then converted into signaling information in this periphery module that has the same data format as the signaling information of the other periphery modules. The through-connection of the frequency mixes from a receiving periphery module via the digital switching matrix network device occurs with corresponding control information that are forwarded via the data interface means of the receiving periphery module to the associated transmission device.

In order to achieve maximum benefit of the further periphery module, the further periphery module can additionally have subscriber connector modules and/or line connector modules whose plurality is dimensioned such that a maximum of 32 time channels of the PCM-structured links can be simultaneously occupied.

A further advantageous development of the present invention is directed to the embedding of a conference network into the modularly structured communications system. It also provides that a conference assembly that evaluates voice signals of conference calls is connected with two PCM-structured links to the digital switching matrix network device. A sequence controller of the conference assembly is connected to the central control processor. The other component parts of the digital communications system are completely unaffected by this, so that a subsequent insertion of a conference network into the communications system is also possible without difficulty. Although the modular structuring of the communications system of the present invention is overall based on a functional point of view, it also takes into consideration to a great extent the configuration of the system. For example, preferably every periphery module is fashioned as a structure unit, whereby the periphery module that also forms central resources can be structurally combined to a certain extent with the central control processor to form a central assembly. The digital switching matrix network device and the conference network, for example, can also be combined into a structural unit in a similar manner. This unit can also have one input/output processor provided for the basic configuration of the communications system. A further structural unit can have plug-in locations for the transmission devices and the further input/output processors required for larger systems.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
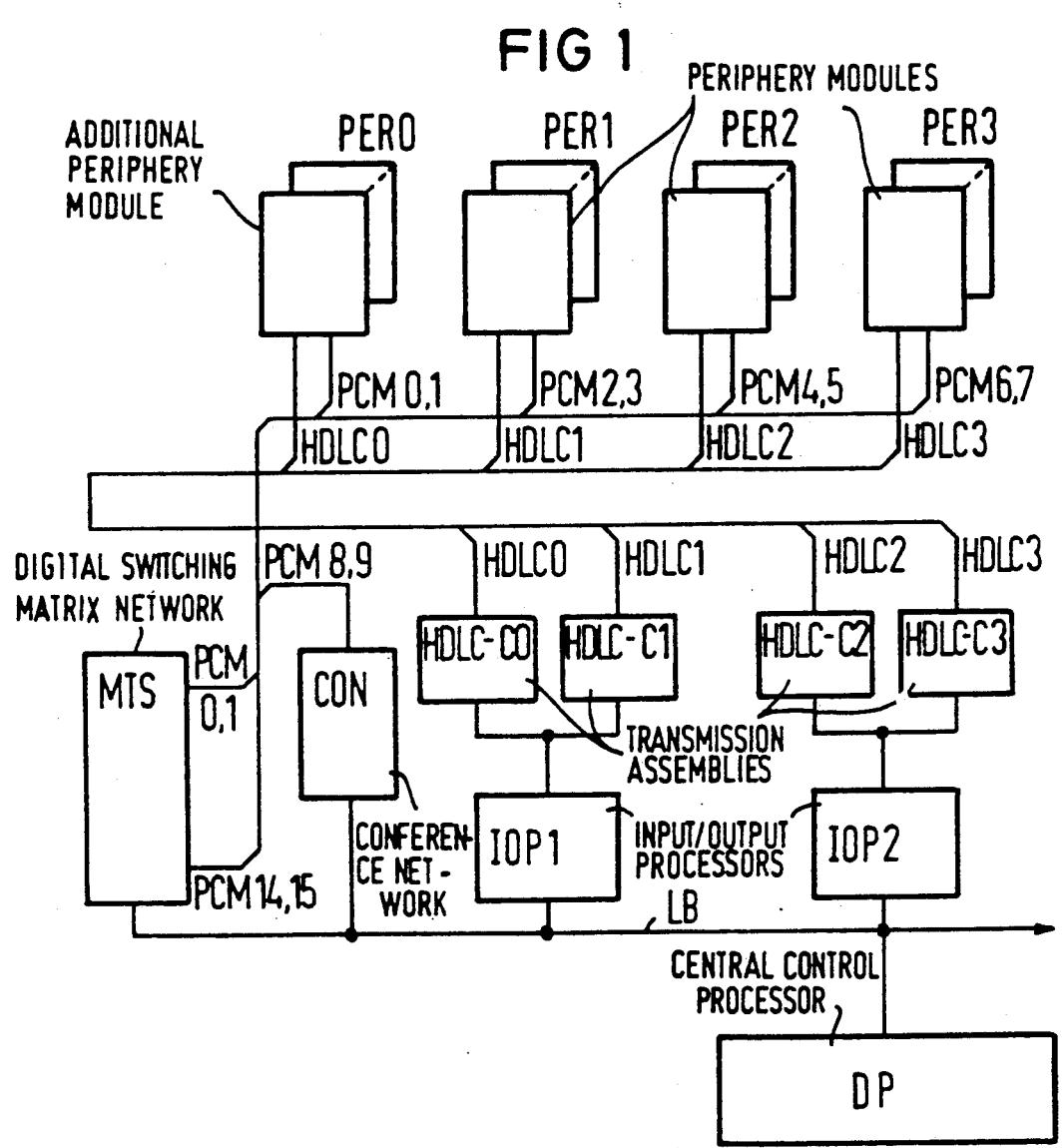
FIG. 1 depicts in block diagram form the architecture of a communications system having two peripheral modules for a total of 64 subscriber connections or line connections.

The communications system shown in FIG. 1 is essentially subdivided into three hierarchic structure levels. The periphery level serving essentially for the connection of terminal equipment and lines is formed by three periphery modules PER1, PER2, PER3. Each of the periphery modules PER1, PER2, PER3 is formed of a plurality of subscriber connector modules or line connector modules such that a maximum of 64 ports (for example, 32 two-wire line connections) are accessible at the periphery modules PER1, PER2, PER3.

For example, the subscriber connector modules can provide for the connection of analog subscriber terminal equipment. For each terminal equipment, they then usually have one interface means having call and loop closure indication to which is allocated a processor means for analog-to-digital or digital-to-analog conversion and for programmable input impedance or level matching. One possible embodiment of these component parts of a subscriber connector module may be derived from U.S. Pat. No. 4,381,561 (herein incorporated by reference). The interface between a maximum of 16 such line-associated equipment and PCM connections or HDLC control lines (high level data link control) intrinsic in the communications system is formed by a module processor control whose structure and functioning can, for example, correspond to those of the processor disclosed in U.S. Pat. No. 4,694,452 (herein incorporated by reference). Further details regarding the function of this processor may be derived from the company publication of Siemens AG, PBC Periphery Board Controller PEB 2050 (SM 205) Preliminary Technical Description (Part 1), Ordering NO. B/2684-101. The coordination control of the module processor control is provided by a microprocessor that can be an integral component part of every subscriber connector module. The function of the coordination control, however, can also be assumed by an input/output processor, for example IOP1, allocated to the respective subscriber connector module.

Other connector modules for, for example, digital or ISDN equipment or links can be provided alone, in addition or in combination in each of the periphery modules PER1, PER2, PER3.

The module processor controls essentially formed by module processor controls and at least one microprocessor serving for the coordination of these each administer two PCM-structured connections (PCM highways) PCM2, PCM3; PCM4, PCM5; PCM6, PCM7 and a respective bi-directional connection HDLC1, HDLC2, HDLC3 for transferring and accepting control information that are transmitted in the standardized data transmission procedure HDLC. A further or additional periphery module PER0 supplies communications system with call progress tones, announcements and music during a hold condition of connections. The additional peripheral module PER0 also contains audible signal receivers, transmission and reception equipment for selection signals transmitted by a multi-frequency code method as well as test transmitters and test receivers. The additional periphery module PER0 is connected via two PCM highways PCM0, PCM1 as well as via an information transmission path HDLC0 in a fashion similar to the periphery modules PER1, PER2, PER3.

Figure 3:
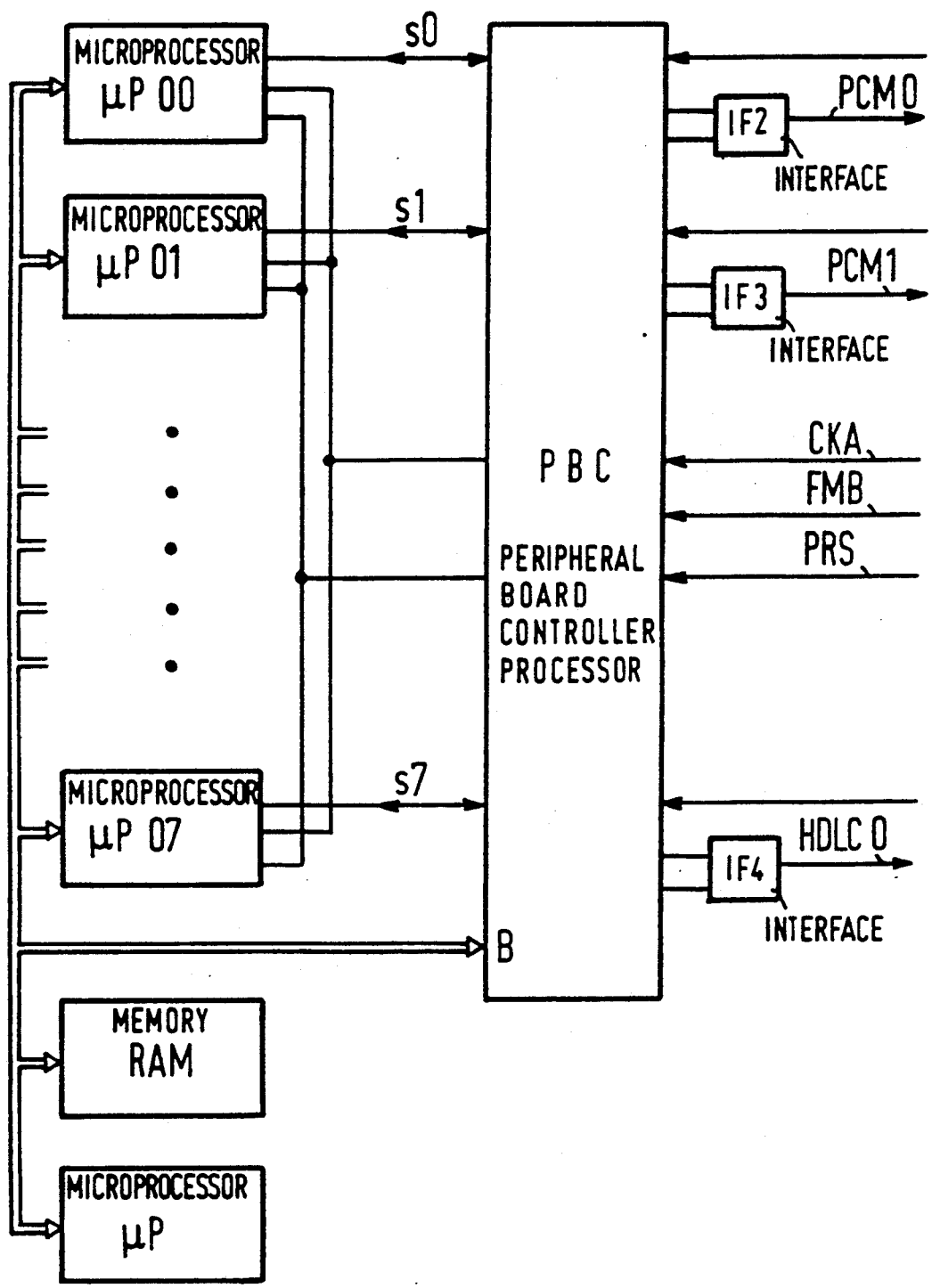
FIG. 3 is a schematic illustration of a peripheral module having devices for supplying the communications system with call progress tones and for receiving and transmitting selection signals.

The structure of the additional periphery module PER0 is shown in FIG. 3 and shall be set forth later.

The next structural level of the digital communications system is formed by a total of four (control information) transmission assemblies HDLC-C0, HDLC-C1, HDLC-C2, HDLC-C3 (HDLC controllers) as well as by two input/output processors IOP1, IOP2, wherein the input/output processor IOP1 is allocated to the two transmission assemblies HDLC-C0 and HDLC-C1 and the input/output processor IOP2 is allocated to the two transmission assemblies HDLC-C2, HDLC-C3.

Since the HDLC standard is used for the exchange of data, instructions and messages in many applicable systems that have a practical implementation, corresponding control information transmission assemblies are implemented in the form of integrated circuits. The communications system shown in FIG. 1 uses these assemblies (HDLC controllers) in the usual manner, so that no hardware or software modifications are needed for the utilization of these assemblies in the communications system. In the data transmission blocks defined in the HDLC standard, the block check field is of special significance within the framework of the communications system of the present invention since the block check sequence transmitted in this field makes possible a transfer of control information protected against errors.

A digital switching matrix network device MTS to which all PCM highways PCM0, PCM1 . . . PCM14, PCM15 are connected also belongs in the same structural level as the (control information) transmission assemblies HDLC-C0 . . . HDLC-C3. For example, the digital switching matrix network device is implemented by an integrated circuit PEB/2040 of Siemens AG. The structure and functioning of a digital switching matrix network device are disclosed, for example, in U.S. Pat. No. 3,678,206 (herein incorporated by reference).

A Conference Network CON that is connected to the digital switching matrix network device MTS with two further PCM highways PCM8, PCM9 is likewise inserted into the structural level of the transmission assemblies HDLC-C0 . . . HDLC-C3 and of the digital switching matrix network device MTS. A possible implementation of the conference network CON is disclosed in U.S. Pat. No. 4,054,757 (herein incorporated by reference).

Just like the two input/output processors IOP1, IOP2, the digital switching matrix network device MTS and the Conference Network CON are connected to a local multiplex bus LB that represents the interface to the hierarchically highest structural level of the digital communications system. This structural level is formed by a central control processor DP that coordinates all assemblies and modules of the communications system. The critical functions of the central control processor are the storing and request-suited handling of switching-oriented programs and, in the direction toward the periphery, the control and monitoring of the local bus LB. Additionally, standard functions of the central control processor are operations-oriented executions, dependability-oriented displays as well as generating clock signals.

Figure 2:
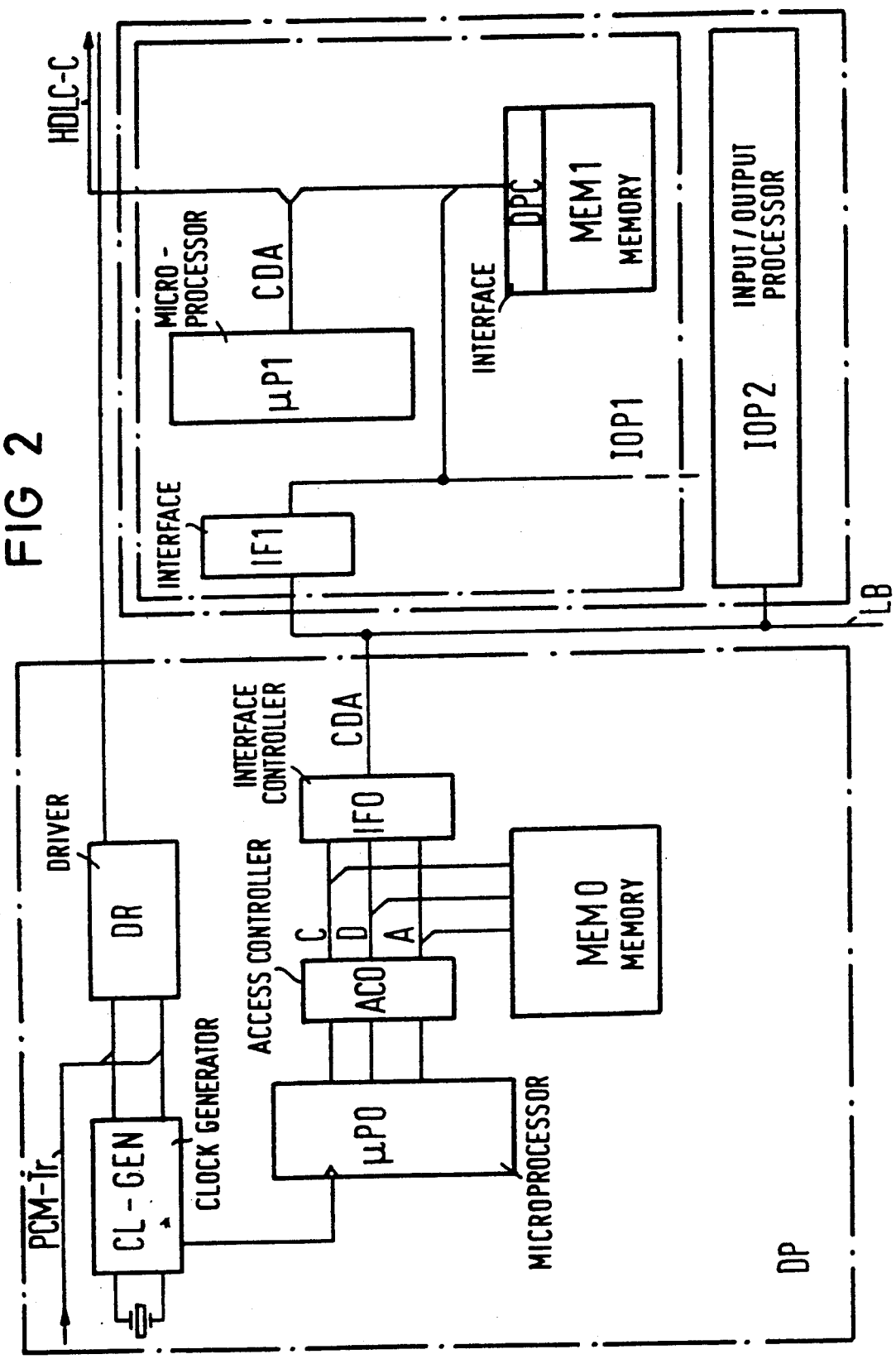
FIG. 2 is a schematic illustration of the central control processor and of an input/output processor.

It may be seen from the schematic illustration of FIG. 2 that the central control processor DP (see FIG. 1) has a microprocessor $\mu P0$ which is preceded by an access controller AC0. Control information C, data information D and address information A are present at this access controller AC0 in incoming and outgoing directions. The microprocessor $\mu P0$ has an internal memory MEM0 allocated to it that, for example, has a memory capacity of about 150K Byte.

A clock generator CL-GEN that outputs clock pulses to the periphery level of the communications system via an adapted driver circuit DR is provided for the synchronization of the overall communications controller to the transmission clock signal PCM-Tr on the PCM lines.

The central control processor DP has an interface controller IF0 that connects it to the multiplex bus LB (also see FIG. 1) and that, among other things, represents the connection to the input/output processors IOP1, IOP2.

In a manner similar to that of the central control processor DP, the input/output processor IOP1 (and the input/output processor IOP2 in a similar way) is equipped with a microprocessor $\mu P1$ to which an internal memory MEM1 is allocated. This memory MEM1 is fashioned as a dual port RAM and consequently has an interface DPC that provides a simultaneous roll-in and roll-out.

In the direction toward the periphery, control information C, data information D and address information A are exchanged with two allocated transmission assemblies HDLC-C (not shown). In the direction toward the central control processor DP, an interface circuit IF1 provides an interface to the multiplex bus LB.

The input/output processors IOP1, IOP2 support the central control processor DP in the handling of time-critical jobs. Important jobs of the input/output processors IOP1, IOP2 are the polling of the connector modules, the control of the information outgoing via the connector modules to the lines or subscribers, the emission of numbers and tone and call clocking.

FIG. 3 shows the critical component parts of the further or additional periphery module PER0 contained in FIG. 1. Based on the illustration of FIG. 1, the two PCM highways that lead to the digital switching matrix network are referenced PCM0 and PCM1. Likewise based on the illustration of FIG. 1, the transmission channel to a (control information) transmission assembly is referenced HDLC0.

Both the PCM highways PCM0, PCM1 as well as the transmission channel HDLC0 represent connections of a processor PBC (peripheral board controller). The two PCM highways PCM0, PCM1 and the transmission assembly HDLC0 are connected to the processor BC by interfaces IF2, IF3 and IF4, respectively. The processor PBC is preferably realized by the same assembly as the module processors. A further connection level of the processor PBC is in communication with a total of eight signal processors $\mu P00$, $\mu P01$ ... $\mu P07$ to which different jobs are assigned. For example, the signal processors $\mu P00$, $\mu P01$ ... $\mu P07$ act as code receivers and code transmitters for selection signals utilized in the multi-frequency code method, for generating call progress tones and announcements as well as for sending and receiving test signals.

A memory RAM for programs and data is allocated to the signal processors $\mu P00$, $\mu P01$ ... $\mu P07$ as well as to the processor PBC. The processor PBC accesses a bus structure via its terminal B. The memory RAM and a module processor $\mu P$ are connected to this bus structure in addition to the signal processors $\mu P00$, $\mu P01$ ... $\mu P07$.

Further outputs of the processor PBC that face toward the communications system serve for the acceptance of the PCM clock signal (2.04 MHz) CKA and of a frame synchronization clock signal, FMB, of 8 kHz. A peripheral reset signal PRS with which a defined initial condition of the further periphery module PER0 can be set is also received by the processor PBC.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A communication system comprising:
   a plurality of subscriber and line connector modules that each has a plurality of connection interface devices and a module processor control allocated to these connection interface devices,
   the module processor control being connected by two PCM-structured connections to a digital switching matrix network device and having a data interface means for a transfer of control information protected block-by-block between the connector modules and a central control processor allocated thereto;
   the plurality of connector modules being combined to form at least one periphery module such that a maximum of 32 subscriber lines or links are allocated to the respective periphery module;
   each periphery module having a control information transmission assembly allocated to it by means of a transmission channel formed of a transmit channel and a receive channel;
   at least two transmission equipments being connected to a shared input/output processor that serves for cyclical scanning of operating statuses of the connection interface devices of appertaining periphery modules as well as for transparent and non-transparent data transmission to the transmission equipments;
   the input/output processor being connected to a multiplex bus that comprises address lines, control lines and data lines;
   a sequence controller of the switching matrix network device being connected to the multiplex bus; the multiplex bus being connected to and administered by the central control processor that controls all switching-oriented procedures and signaling using a system data memory connected to the central control processor.

2. The communication system according to claim 1, wherein a further periphery module is connected by two additional PCM-structured connections to the digital switching matrix network device with a central signaling means having transmission and reception means for call progress tones and selection signals.

3. The communication system according to claim 2, wherein the transmission and reception means for selection signals have a data interface for the block-by-block, protected transfer of binarily coded numbers to be converted into selection signals or derived from the selection signals between the further periphery module and a further transmission assembly allocated thereto.

4. The communication system according to claim 2, wherein the further periphery module has at least one of additional subscriber connector modules and line connector modules and wherein a maximum of 32 time channels of the PCM-structured connections can be simultaneously occupied.

5. The communication system according to claim 1, wherein a conference module that evaluates voice signals of conference calls is connected to the digital switching matrix network device by two further PCM-structured connections and a sequence control of the conference module.

6. A communication system comprising:
   a plurality of subscriber and line connector modules that each has a plurality of connection interface devices and a module processor control allocated to these connection interface devices,
   the module processor control being connected by two PCM-structured connections to a digital switching matrix network device and having a data interface mans for a transfer of control information protected block-by-block between the connector modules and a central control processor allocated thereto;
   the plurality of connector modules being combined to form at least one periphery module such that a maximum of 32 subscriber lines or links are allocated to the respective periphery module;
   each periphery module having a control information transmission assembly allocated to it by means of a transmission channel formed of a transmit channel and a receive channel;
   at least two transmission equipments being connected to a shared input/output processor that serves for cyclical scanning of the operating statuses of the connection interface devices of appertaining periphery modules as well as for transparent and non-transparent data transmission to the transmission equipments;

the input/output processor being connected to a multiplex bus that comprises address lines, control lines and data lines;

a sequence controller of the switching matrix network device being connected to the multiplex bus; the multiplex bus being connected to and administered by the central control processor that controls all switching-oriented procedures and signaling using a system data memory connected to the central control processor; and a further periphery module connected by two additional PCM-structured connections to the digital switching matrix network device with a central signaling means having transmission and reception means for call progress tones and selection signals.

7. The communication system according to claim 6, wherein the transmission and reception means for selection signals have a data interface for the block-by-block, protected transfer of binarily coded numbers to be converted into selection signals or derived from the selection signals between the further periphery module and a further transmission assembly allocated thereto.

8. The communication system according to claim 6, wherein the further periphery module has at least one of additional subscriber connector modules and line connector modules and wherein a maximum of 32 time channels of the PCM-structured connections can be simultaneously occupied.

9. The communication system according to claim 6, wherein a conference module that evaluates voice signals of conference calls is connected to the digital switching matrix network device by two further PCM-structured connections and a sequence control of the conference module.

10. A communication system comprising:

a plurality of subscriber and line connector modules that each has a plurality of connection interface devices and a module processor control allocated to these connection interface devices, the module processor control being connected by two PCM-structured connections to a digital switching matrix network device and having a data interface means for a transfer of control information protected block-by-block between the connector modules and a central control processor allocated thereto;

the plurality of connector modules being combined to form at least one periphery module such that a maximum of 32 subscriber lines or links are allocated to the respective periphery module;

each periphery module having a control information transmission assembly allocated to it by means of a transmission channel formed of a transmit channel and a receive channel;

at least two transmission equipments being connected to a shared input/output processor that serves for cyclical scanning of operating statuses of the connection interface devices of appertaining periphery modules as well as for transparent and non-transparent data transmission to the transmission equipments;

the input/output processor being connected to a multiplex bus that comprises address lines, control lines and data lines;

a sequence controller of the switching matrix network device being connected to the multiplex bus; the multiplex bus being connected to and administered by the central control processor that controls all switching-oriented procedures and signaling using a system data memory connected to the central control processor;

a further periphery module connected by two additional PCM-structured connections to the digital switching matrix network device with a central signaling means having transmission and reception means for call progress tones and selection signals; and a conference module that evaluates voice signals of conference calls connected to the digital switching matrix network device by two further PCM-structured connections and a sequence control of the conference module.

11. The communication system according to claim 10, wherein the transmission and reception means for selection signals have a data interface for the block-by-block, protected transfer of binarily coded numbers to be converted into selection signals or derived from the selection signals between the further periphery module and a further transmission assembly allocated thereto.

12. The communication system according to claim 10, wherein the further periphery module has at least one of additional subscriber connector modules and line connector modules and wherein a maximum of 32 time channels of the PCM-structured connections can be simultaneously occupied.

* * * * *